United States Patent
Tan et al.

(10) Patent No.: US 9,832,137 B1
(45) Date of Patent: Nov. 28, 2017

(54) PROVISIONING SYSTEM AND METHOD FOR A DISTRIBUTED COMPUTING ENVIRONMENT USING A MAP REDUCE PROCESS

(71) Applicant: VCE Company, LLC, Richardson, TX (US)

(72) Inventors: Michael Tan, Palo Alto, CA (US); Akshaya Mahapatra, San Jose, CA (US); Sazzadul K. Kahn, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 413 days.

(21) Appl. No.: 14/665,836

(22) Filed: Mar. 23, 2015

(51) Int. Cl.
*G06F 15/173* (2006.01)
*H04L 12/911* (2013.01)
*H04L 12/801* (2013.01)

(52) U.S. Cl.
CPC .............. *H04L 47/78* (2013.01); *H04L 47/10* (2013.01); *H04L 47/70* (2013.01)

(58) Field of Classification Search
CPC ...................................................... H04L 47/78
USPC ................................................. 709/226, 223
See application file for complete search history.

(56) References Cited

U.S. PATENT DOCUMENTS

| | | | |
|---|---|---|---|
| 2013/0104140 A1* | 4/2013 | Meng | G06F 9/5066 718/104 |
| 2013/0290972 A1* | 10/2013 | Cherkasova | G06F 9/5066 718/103 |
| 2013/0318525 A1* | 11/2013 | Palanisamy | G06F 9/5066 718/1 |
| 2013/0332612 A1* | 12/2013 | Cai | G06F 9/5066 709/226 |
| 2014/0019987 A1* | 1/2014 | Verma | G06F 9/5038 718/103 |
| 2014/0089727 A1* | 3/2014 | Cherkasova | G06F 11/3404 714/6.13 |
| 2014/0181831 A1* | 6/2014 | Le Scouarnec | G06F 9/5027 718/104 |
| 2014/0358977 A1* | 12/2014 | Cramer | G06F 17/30203 707/827 |
| 2015/0200867 A1* | 7/2015 | Dutta | H04L 49/3045 709/226 |
| 2016/0275123 A1* | 9/2016 | Lin | G06F 9/4881 |

* cited by examiner

*Primary Examiner* — Philip B Tran
(74) *Attorney, Agent, or Firm* — Polsinelli PC (57) ABSTRACT

A provisioning system for a distributed computing environment includes a map reduce framework that includes a splitter process, a mapper process, and a reduce process. The splitter process receives a task associated with a distributed application to be deployed on the distributed computing environment, and selects which of the resources are to be provisioned for executing the distributed application. The mapper process converts at least one abstract address included in the task to an absolute address, and executes the task for provisioning the selected resources, while the reduce process consolidates results of the executed task.

20 Claims, 6 Drawing Sheets

PROVISIONING SYSTEM AND METHOD FOR A DISTRIBUTED COMPUTING ENVIRONMENT USING A MAP REDUCE PROCESS

TECHNICAL FIELD

Aspects of the present disclosure relate to computing devices and, in particular, to a provisioning system and method for a distributed computing environment using a map reduce process.

BACKGROUND

A map reduce process, also sometimes referenced as MapReduce, generally includes a computer-implemented process for processing large amounts of data in parallel using resources, such as many servers, that are distributed throughout a distributed computing environment. The map reduce process includes a map procedure that filters and sorts data, and a reduce process that perform summary operations on the filtered and sorted data. The map reduce process may also be useful for executing tasks in a distributed fashion that among other things, provides redundancy for enhanced fault tolerance. Map reduce processing is conventionally used most often for searching large amounts of data for specific information and word counting.

SUMMARY

According to one aspect of the present disclosure, a provisioning system for a distributed computing environment includes a map reduce framework that includes a splitter process, a mapper process, and a reduce process. The splitter process receives a task associated with a distributed application to be deployed on the distributed computing environment, and selects which of the resources are to be provisioned for executing the distributed application. The mapper process converts at least one abstract address included in the task to an absolute address, and executes the task for provisioning the selected resources, while the reduce process consolidates results of the executed task.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

DETAILED DESCRIPTION

Embodiments of the present disclosure provide a provisioning system and method for a distributed computing environment that uses a map reduce process. Typically, resources of a distributed computing environment are provisioned when they are allocated for use with a distributed application. While currently implemented distributed computing environments can often have numerous managed resources (e.g., more than 100,000 managed resources) that span large geographical regions, management of these resources can be difficult as various distributed applications deployed on the resources may be added, removed, and/or modified on a weekly if not a daily basis. Each distributed application may use a small subset of these resources (e.g., approximately 10 to 200 resources) that may be distributed throughout the distributed computing environment. Nevertheless, management of this relatively smaller group of resources may be difficult to accomplish when the resources allocated to each distributed application may be randomly distributed over the relatively large number of available resources of a distributed computing environment. Embodiments of the present disclosure provide a solution to this problem, among other problems, by using a map reduce process to facilitate provisioning of resources for use in deploying distributed applications on a distributed computing environment.

In general, distributed computing environments are configured to provide resources over a distributed group of computing nodes for execution of distributed applications in a manner that provides redundancy for enhanced reliability and fault tolerance. That is, each distributed application generally includes a set of instructions that may be deployed or otherwise distributed over the resources of one or several computing nodes in the distributed computing environment. In many cases, these distributed applications may be provisioned for a period of time and then removed when no longer needed in order to free the resources for use with other distributed applications.

The provisioning of resources used to deploy a distributed application are typically provided by tasks (e.g., scripts, workflows, etc.) that are executed on those resources. Nevertheless, conventional techniques for executing the tasks has heretofore remained essentially a manual process in which the resources to be used are first selected, and then manually provisioned using the tasks, which in many cases, are uniquely adapted for use with each type of resource. This conventional process is often time consuming and may also lack the capability of parallel execution across multiple computing nodes of the distributed computing environment, a common communication interface (e.g., a SQL interface) for communicating with each resource, and aggregation of the resulting output from the execution of the tasks to ensure each resource has been properly provisioned.

Embodiments of the present disclosure provide a technique to synergistically utilize the functionality of a map reduce process to enhance the provisioning capabilities of resources used to support distributed applications in a distributed computing environment 104. For example, a map reduce process typically provides for parallel execution on multiple resources while maintaining a standardized means of communicating among each resource, which may provide for parallel provisioning of resources 112 used to support the distributed application 114. Additionally, the map reduce process provides for marshalling such that individual resources 112 may receive and process tasks using protocol environments uniquely established for each resource 112 in a manner that allows concurrent provisioning of resources 112 in an organized, consistent manner.

Figure 1:
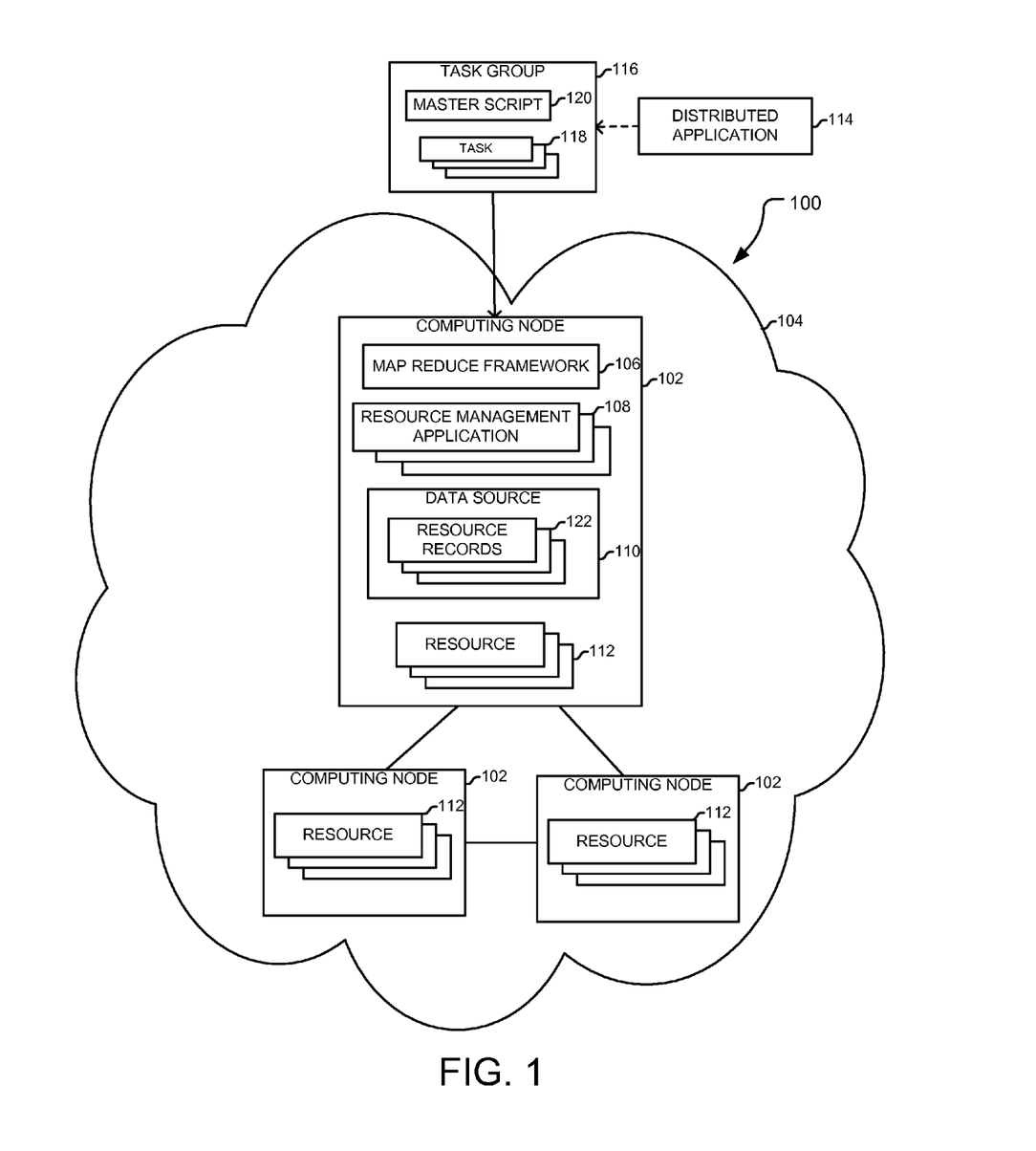
FIG. 1 illustrates an example resource provisioning system 100 for a distributed computing environment that may provide a solution to these problems and other problems associated conventional resource provisioning systems according to one embodiment of the present disclosure.

FIG. 1 illustrates an example resource provisioning system 100 for a distributed computing environment that may provide a solution to these problems and other problems associated with conventional resource provisioning systems according to one embodiment of the present disclosure. The resource provisioning system 100 may be implemented on each of multiple computing nodes 102 of a distributed computing environment 104 in which each computing node 102 is configured with a map reduce framework 106, one or more resource management applications 108, a data source 110, and multiple resources 112 for supporting a distributed application 114. Although only one computing node 102 is shown having a map reduce framework 106, one or more resource management applications 108, and a data source 110, it should be understood that some, most, or all computing nodes 102 in the distributed computing environment 104 will have similar elements.

When a distributed application 114 is to be deployed in the distributed computing environment 104, the map reduce framework 106 of a first computing node 102 receives a task group 116 associated with a distributed application 114 to be deployed, and for each task 118 included in the task group 116, selects one or more appropriate resource 112 in the distributed computing environment 104 on which to deploy the distributed application 114, and transmits the task 118 to the computing node 102 of the selected resource 112 for execution of the task 118.

In one embodiment, the map reduce framework 106 comprises a commercial off-the-shelf product, such as an open-source implementation that is configured to manage big data sets over a distributed group of computing nodes 102 as may be typically found in a distributed computing environment 104. For example, the map reduce framework 106 may include an Apache Hadoop™ map reduce framework that is provided by the Apache Software Foundation™, which is headquartered in Forest Hill, Md.

Each task group 116 may include one or more tasks, such as scripts and/or workflows, used for provisioning the resources 112 used to support the distributed application 114. The task group 116 also includes a master script 120 that includes executable instructions indicating how each of the individual tasks 118 is to be executed. For example, the master script 120 may include directives instructing the map reduce framework 106 to execute certain scripts prior to the execution of certain other scripts, or instructing the map reduce framework 106 to execute certain scripts concurrently with one another. As another example, the master script 120 may include instructions for a particular resource management application 108 to be used to provision certain resources 112 associated with a particular set of tasks 118, while another resource management application 108 is to be used to execute another particular set of tasks 118. As yet another example, the master script 120 may include one or more conditional directives that instruct the resource 112 and/or the resource management application 108 used to provision the resource 112 to perform certain corrective actions in the event that a provisioning attempt of a resource 112 have failed.

A script generally refers to a combined set of instructions that, when executed by a computer, perform various functions in association with the computing system they are executed on. The functions performed may include, for example, launching certain applications, setting environment variables of the operating system and/or hardware components of the computing device, and even calculating values to be used for setting the environment variables. In one embodiment, the scripts comprise an alpha-numeric document file that includes multiple instructions. When executed, each instruction is interpreted by the operating system or executor in which the instruction is executed. In one aspect, each instruction generally includes a command with one or more arguments that are interpreted by the operating system (e.g., runtime environment) that could otherwise be executed one at a time via a terminal of the operating system. In another aspect, the instructions may be interpreted and executed by an executor, such as a powershell executor, a workflow executor, or a Java package executor.

In one embodiment, the tasks (e.g., scripts, workflows, etc.) may include abstract addresses that may be converted to absolute addresses during runtime. In many cases, it may be difficult if not impossible to know the network address of the resource management application 108 that is to be used to provision a certain resource, or to know networking information (e.g., the sub-network that the resource 112 is to be configured) prior to its provisioning in the distributed computing environment 104. In one embodiment, the tasks 118 may be written with abstract addresses that are replaced with absolute addresses when the task 118 is executed to provision the resource 112. For example, the abstract address may include a tag that references a particular resource management application, such as a '@@managementVirtualCenter' tag that references an appropriate management virtual center resource management application in each computing node 102, a '@@UCSManagerConnection' tag that references an appropriate element manager resource management application in the computing node 102, or a '@@ArrayManager' tag that references an appropriate array manager resource management application in each computing node 102. Although the map reduce framework 106 is described herein as being adapted to provision resources according to tasks 118 included in a task group 116, other embodiments contemplate that the map reduce framework 106 may also receive and process a single task 118 that is not included as a portion of a task group 116, or receive and process a task group 116 having one or more tasks 118 with no master script 120.

In one embodiment, the task group 116 is packaged in a file format, such as a Java Archive (.jar) file format, or .zip file format, or other similar type file format, such that a single file may be provided to the map reduce framework 106 for processing. Thus, in one embodiment, the map reduce framework 106 may include a parsing algorithm for extracting (e.g., un-packaging) the master script 120 and other tasks 118 from the task group 116. When the master script 120 and tasks 118 are extracted from the task group 116, the map reduce framework 106 may then commence execution of the master script 120 to perform a structured sequence for processing each of the tasks 118.

The resources 112 generally refer to hardware or virtual computing devices that perform some function for the overall operation of the distributed computing environment 104, while the computing nodes 120 generally refer to physically distinct structures (e.g., computing racks) that house the resources 112 and provide electrical power and other ancillary functions for the resources 112. The map reduce framework 106 uses the task group 116 to provision certain resources 112 for supporting a distributed application 114, which may be any suitable type, such as one that executes a web-based application for use on the Internet.

Each computing node 102 includes one or more resource management applications 108 that are used to manage the resources 112 configured on their respective computing nodes 102. For example, one resource management application 108 may include a management virtual center application that manages the instantiation, operation, and removal of virtual object resources of their respective computing node, an element manager that manages the operation of hardware resources on its respective computing node 102, and an array manager that manages operation of individual arrays (e.g., blade arrays, or other clusters) in its respective computing node 102.

The provisioning of resources 112 often is provided by the execution of tasks 118, which calls one or more of the resource management applications 108. For example, a virtual object resource 112 may execute a provisioning task that generates a request to a management virtual center resource management application that upon receipt of the request, performs one or more provisioning operations for that resource 112, such as allocating a unique identifier for that resource 112, assigning one or more network connections for that resource 112, and the like.

The data source 110 stores resource records 122 for each resource 112 deployed in the distributed computing environment 104. The resource records 122 may be populated in any manner, such as by a discovery process that is performed on a newly deployed distributed computing environment 104 or an existing distributed computing environment 104 that has yet to be configured for use by the map reduce framework 106. Each resource record 122 stores various types of information about its respective resource 112, such as the type of resource, any particular services (e.g., software applications) installed on the resource, a particular resource management application to be used for provisioning the resource, performance information (e.g., number of CPUs, amount of memory, etc.) about the resource, and the like.

The computing nodes 102 of the distributed computing environment 104 communicate with one another using a communications network. Nevertheless, the computing nodes 102 may communicate with one another in any suitable manner. For example, the computing nodes 102 may communicate with each other using wireless and/or wired communications. In one embodiment, the computing nodes 102 communicate with one another using a communication network, such as the Internet, an intranet, or another wired and/or wireless communication network. In another embodiment, the computing nodes 102 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the computing nodes 102 may communicate with one another without the use of a separate and a distinct network.

As shown, the distributed computing environment 104 includes multiple computing nodes 120 that each provides multiple resources 112 for use by the distributed computing environment 104. Nevertheless, the distributed computing environment 104 may include any type and number of resources. The resources 112 of the distributed computing environment 104 generally refer to computing devices, such as hardware computing devices (e.g., hosts) or virtual computing devices (e.g., virtual objects) that perform some function for the overall operation of the distributed computing environment 104. Examples of such computing devices may include, for example, laptop or notebook computers, workstations, personal digital assistants (PDAs), tablet computers, and the like, and/or complex computing structures, such as clusters, unified computing systems, fabric-based computing systems, and dynamic infrastructures. The computing devices may also include other communication devices, such as switches, routers, firewall appliances, or other communication device that facilitates communication among multiple other computing devices. The distributed computing environment 104 may also include distributed computing systems, such as storage arrays, network resource, compute devices, and/or any combination thereof. For example, one or more of the computing nodes 102 may comprise converged infrastructures configured in a cloud computing environment.

Figure 2A:
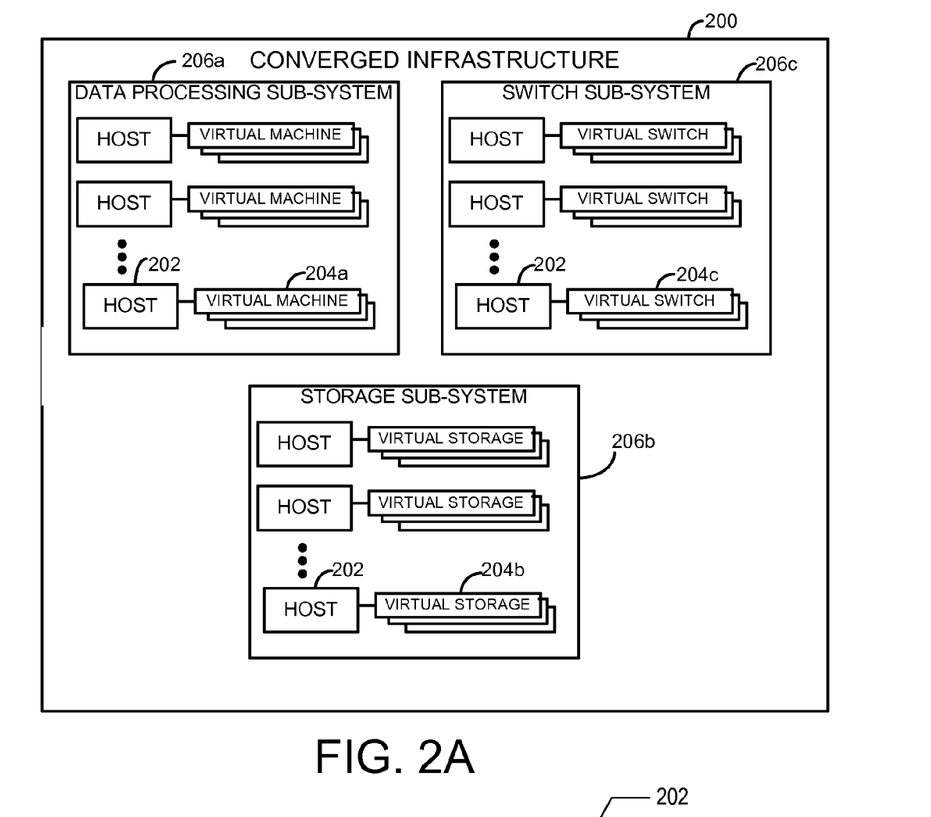
FIGS. 2A and 2B illustrate an example converged infrastructure that may be implemented as a computing node of the distributed computing environment according to one embodiment of the present disclosure.
Figure 2B:
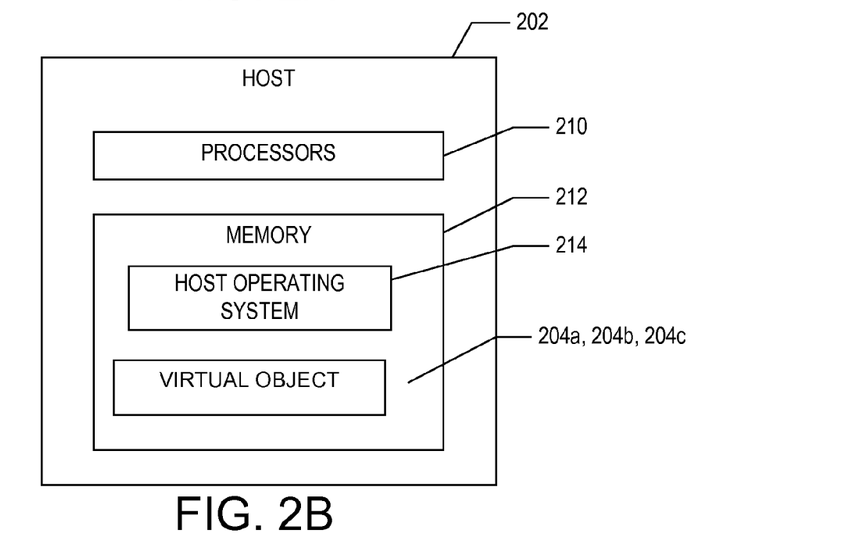

FIGS. 2A and 2B illustrate an example converged infrastructure 200 that may be implemented as one computing node 120 of the distributed computing environment 104 according to the teachings of the present disclosure. For example, multiple converged infrastructures 200 as described herein may be configured to communicate with one another using a communication network, such as the communication network 126 to form at least a portion of the distributed computing environment 104. As another example, a single converged infrastructure 200 comprising a distributed computing environment 104 may be managed by the system 100 to tag resources 112 according to the tenants 116 who use those resources.

The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual resources 112 and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is located in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 106 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 200 according to one aspect of the distributed computing environment management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
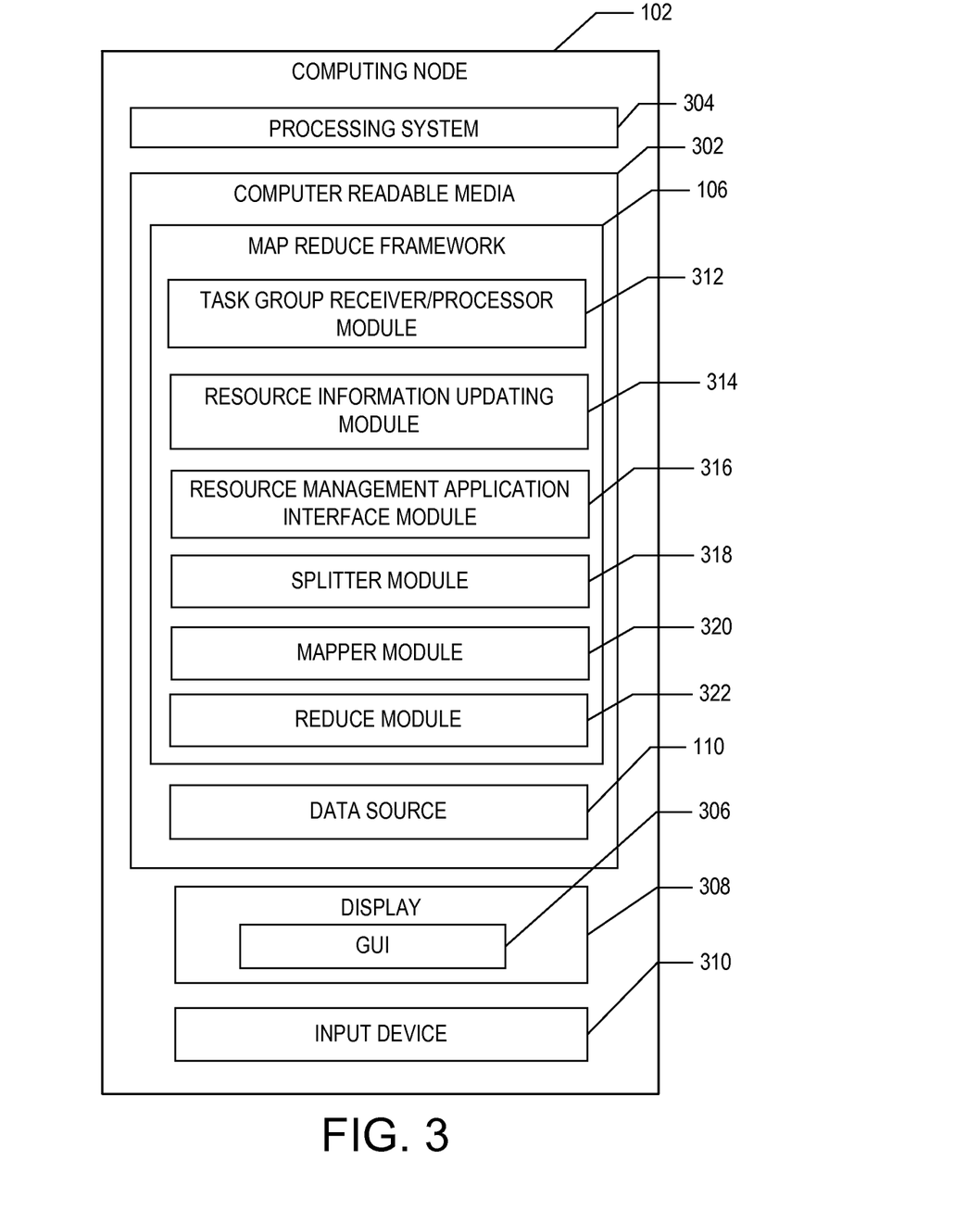
FIG. 3 illustrates a block diagram of an example map reduce framework executed on a computing node according to one embodiment of the present disclosure.

Referring now in more detail to FIG. 3, a block diagram of an example map reduce framework 106 executed on a computing node 102 is depicted according to one aspect of the present disclosure. The map reduce framework 106 is stored in a computer readable media 302 and executed on a processing system 304 of the computing node 102. The computing node 102 may include any type of computing system, such as one or more management computing systems, personal computers, mobile computers and/or other mobile devices, and other hosts.

According to one aspect, the computing node 102 may provide a graphical user interface (GUI) 306 displayed on the display 308, such as a computer monitor, for displaying data. The computing node 102 may also include an input device 310, such as a keyboard or a pointing device (e.g., a mouse, trackball, pen, or touch screen) to enter data into or interact with the GUI 306. According to one aspect, the map reduce framework 106 includes instructions or modules that are executable by the processing system 304 as will be described in detail herein below.

The computer readable media 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A task group receiver/processor module 312 receives task groups 116 and processes the received task groups 116 to facilitate provisioning of resources 112 to be used by the distributed application 114 associated with the task group 116. The task group receiver/processor module 312 may receive a task group 116 from a remote terminal, which may be, for example, a user terminal communicatively coupled to the distributed computing environment 104 through a communication network, or the GUI 306 of the computing node 102. The task group receiver/processor module 312 then reads and executes the master script 120 to determine how to process each of the tasks 118 in the task group 116. For example, the master script 120 may include an instruction to provision a specified quantity of first resources 112 in the distributed computing environment 104 and wait for one or more report messages indicating that the resource(s) have been successfully provisioned before processing an ensuing instruction, which may be an instruction for provisioning another group of resources that are dependent upon initial provisioning of the first resources 112. The task group receiver/processor module 312 may also process any conditional directives in the master script 120 to be performed for any suitable reason, such as in the event that a provisioning attempt has failed.

Although the task group receiver/processor module 312 is described above as being adapted to receive and process task groups 116 including a master script 120 and multiple tasks (e.g., scripts, workflows, etc.), it should be understood that the task group receiver/processor module 312 may also be configured to receive and process a single task 118 that does not comprise a portion of a task group 116, or receive and process a task group 116 having one or more tasks 118 and no master script 120.

A resource information updating module 314 updates the resource records 122 associated with each resource to maintain up-to-date information about each on an ongoing basis. In one embodiment, the resource information updating module 314 may communicate with a resource management application 108 to receive information about each resource when it changes, and update the resource record 122 associated with that resource. For example, when the resource management application 108 modifies the configuration and/or parameters associated with a particular resource, the application 108 may also transmit a notification message to the resource information updating module 314 that in turn, updates the resource record 122 associated with the resource to reflect the modifications. In one embodiment, the resource information updating module 318 may perform a discovery process to populate the data source 110 with resource records 122 of a distributed computing environment 104, such as a newly deployed distributed computing environment 104 or an existing distributed computing environment 104 that has yet to be configured for management by the map reduce framework 106.

Although the resource information updating module 314 as described above receives resource information via a resource management application 108, other embodiments of the resource information updating module 314 may receive resource information from other sources, such as the resources themselves. For example, the resource information updating module 314 may communicate with each resource using application program interfaces (APIs) configured on each resource, which may be accessed by the resource information updating module 314 to update the resource records 122 associated with that resource. The resource information updating module 314 may also receive status information from each resource for monitoring its various characteristics, such as any applications that have been installed, any particular purpose allocated for that resource, resource management application 108 to be used for its configuration, and the like.

A resource management application interface module 316 provides an interface to the resource management applications 108 for transmitting and receiving information about the distributed computing environment 104 and/or resources 112 configured in the distributed computing environment 104. For example, the resource management application interface module 316 may communicate with one or more resource management applications 108 to receive resource information about the resources such as described above.

A splitter module 318 determines which resources 112 in the distributed computing environment 104 are to be configured for use with the distributed application 114. For example, the splitter module 318 may receive a request from the task group receiver/processor module 312 to allocate ten virtual storage objects (e.g., resources 112) across the distributed computing environment 104, and in response, select ten un-used virtual storage objects in response to the request. The resources 112 may be selected according to any criteria. The resources may be selected according to an automatic selection process, a system wide selection process, or a specific resource selection process. The type of selection process may be specified for each task 118 in the master script 120 of the task group 116. For example, if the splitter module 318 is to select resources 112 according to the automatic selection process, the splitter module 318 may automatically select the resources according to a specified criteria, such as using performance criteria stored in the resource records 122, to find resources 112 having a minimum specified level of performance as specified in the task group 116. Additionally, the splitter module 318 may select resources 112 according to one or more algorithms, such as a round robin process, a least loaded process, a least recently used process, and the like.

If the splitter module 318 is to select resources 112 according to the system wide selection process, the module 318 may select at least one resource 112 from each computing node 102 in the distributed computing environment 104. This behavior may be useful for generic tasks (e.g., creating a virtual local area network (VLAN) on all computing nodes 102) that need to be executed on all computing nodes 102. Conversely, if the splitter module 318 is to select resources 112 according the specific resource selection process, one or more resources specifically identified in the task group 116 may be selected. This behavior may be useful for specific operations, such as creation of a VLAN on a specific computing node 102.

A mapper module 320 converts abstract addresses in the tasks 118 to absolute addresses when the task 118 is to be executed for provisioning its associated resource 112, and manages execution of the tasks 118 on each resource 112. The mapper module 320 may read each task 118 to determine whether any abstract addresses (e.g., tags) exist, and if so, replace the abstract addresses with absolute addresses associated with the abstract addresses. For example, the mapper module 320 may determine upon inspection of a task 118 to be executed, that an abstract address exists for a particular resource management application 108 to be used for provisioning the resource 112 associated with the task 118. In such a case, the mapper module 320 may obtain the network address of that particular resource management application 108 and replace the abstract address with the absolute address of that resource management application 108. Then the mapper module 320 then transmits the modified task in which its abstract addresses have been converted to absolute addresses, and transmits the modified task 118 to the resource 112 selected by the splitter module 318 for execution by that resource 112.

In one embodiment, the mapper module 320 identifies a type of the task 118, and forwards the task 118 to an executor appropriate for execution of the task 118. Each task 118 may be uniquely dedicated for execution for a certain type of executor, such as a powershell executor that executed powershell scripts, a workflow executor that executes workflows, and/or a Java package executor that executes Java scripts. The mapper module 320 identifies the type (e.g., powershell, workflow, Java script, etc.) of the task 118 and calls its appropriate executor on the resource 112 for execution of the task 118.

A reducer module 322 consolidates results of the mapper module 320 to generate report messages to be sent back to the task group receiver/processor module 312. For example, the reducer module 322 may receive messages from the mapper module 320 indicating a status of any executed task (e.g., pass, fail, partially failed, etc.). That is, the reducer module 322 may obtain status information about whether the provisioning attempt has passed or not, and generate a report message that is subsequently transmitted back to the task group receiver/processor module 312.

In one embodiment, the splitter module 318, the mapper module 320, and the reduce module 322 may comprise a portion of a commercial-off-the-shelf (COTS) map reduce product. In such a case, the functionality described above may be provided by code, one or more sets of instructions, or other forms of logic that interface with the COTS map reduce product using a suitable interface structure, such as one or more application program interface (API) structures of each of the splitter module 318, the mapper module 320, and the reduce module 322.

It should be appreciated that the modules described herein are provided only as examples, and that the resource tagging service 104 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 200 as described above with reference to FIGS. 2A and 2B.

Figure 4:
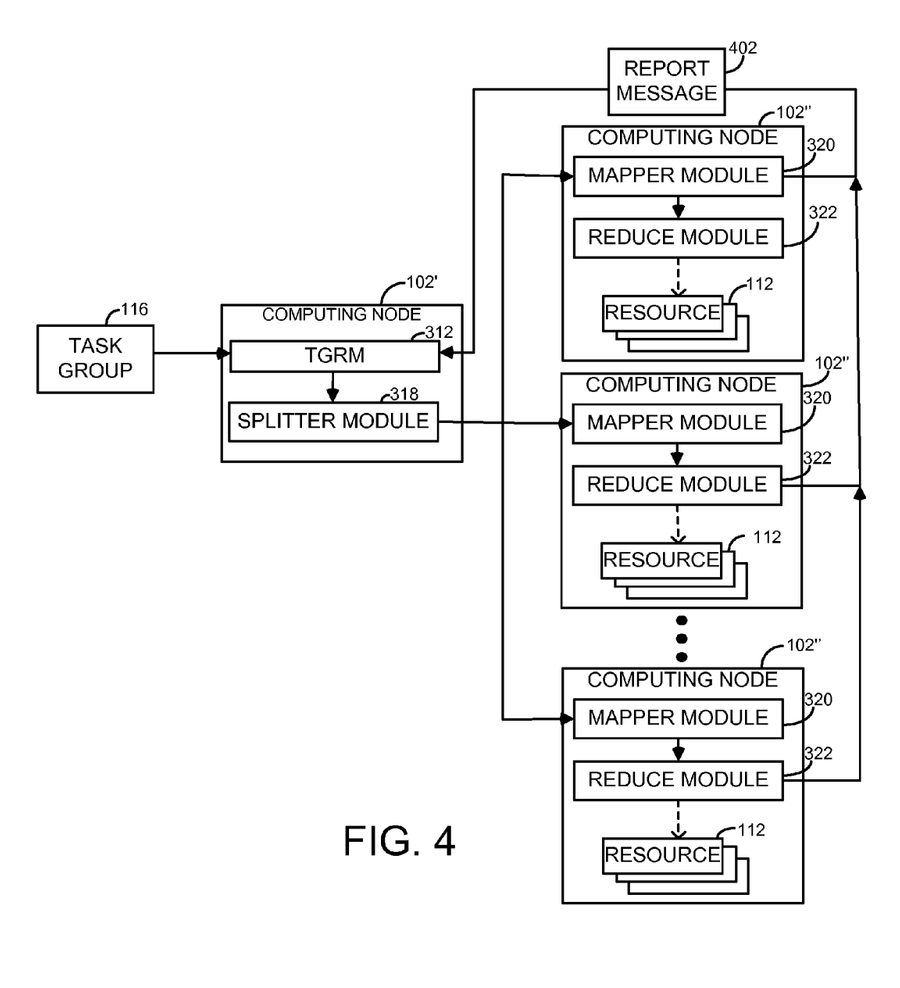
FIG. 4 illustrates an example process flow showing how the task group receiver/processor module, the splitter module, the mapper module, and the reduce module of the map reduce framework may interact with one another and with the resources to be allocated for supporting a distributed application may be provisioned according to one embodiment of the present disclosure.

FIG. 4 illustrates an example process flow showing how the task group receiver/processor module (TGRM) 312, the splitter module 318, the mapper module 320, and the reduce module 322 may interact with one another and with the resources 112 to be allocated for supporting a distributed application 114 may be provisioned according to one embodiment of the present disclosure. Initially a task group 116 is received by a first computing node 102' in the distributed computing environment 104. The task group receiver/processor module 312 commences execution of the master script 120 included in the task group 116. The instructions in the master script 120 provides for a structured sequence of provisioning resources 112 across multiple second computing nodes 102" in the distributed computing environment 104. For example, the master script 120 may include a set of multiple ordered instructions that, when executed, instructs a first task to be distributed to the second computing nodes 102", waits for completion of the first task on each of the selected second computing nodes 102", and then instructs a second task 118 to be distributed in a likewise manner. This process may continue for additional tasks 118 until all tasks 118 to be used for provisioning the resources 112 to support a distributed application 114 have been provisioned in the distributed computing environment 104.

To facilitate execution of a task 118, the task group receiver/processor module 312 sends the task 118 to the splitter module 318 along with instructions associated with how to select which resources 112 are to be used (e.g., the automatic selection process, the system-wide selection process, or the specific resource selection process). When the resources 112 are selected, the splitter module 318 then transmits a copy of the task 118 to the computing node 102" associated with each of the selected resources 112.

The mapper module 320 configured in each second computing node 102" converts any abstract addresses in the task 118 to absolute addresses and executes the task 118 in order to provision the resources 112. Upon completion of the task 118, each reduce module 322 may then generate a report message that is transmitted back to the task group receiver/processor module 312 indicating whether the task has been completed successfully or not. If the task(s) 118 have been successfully completed by the mapper module 320 of all second computing nodes 102", the task group receiver/processor module 312 may proceed to process the next task 118 to be executed. However, if the task 118 has not been successfully completed, the task group receiver/processor module 312 may perform one or more corrective actions based upon instructions included in the master script 120. For example, the master script 120 may instruct the task group receiver/processor module 312 to have a different resource 112 selected in the event of a failure report message 402, and/or generate an alert message to the GUI 322 of the first computing node 102' indicating to users that a provisioning task has failed. The process as described above may be repeated to provision other resources 112 using tasks 118 included in the task group 116.

The process flow as described in FIG. 4 merely illustrates one example of how resources 112 may be provisioned for supporting a distributed application 114, and it should be understood that variations of the described process flow may be provided without departing from the spirit and scope of the present disclosure. For example, although three second computing nodes 102" are shown, resources 112 may be provisioned in any quantity of computing nodes 102 such as one, two, or four or more computing nodes 102. Additionally, resources 112 may be selected and provisioned on the first computing node 102' using the mapper module 320 and reduce module 322 configured on the first computing node 102'.

Figure 5:
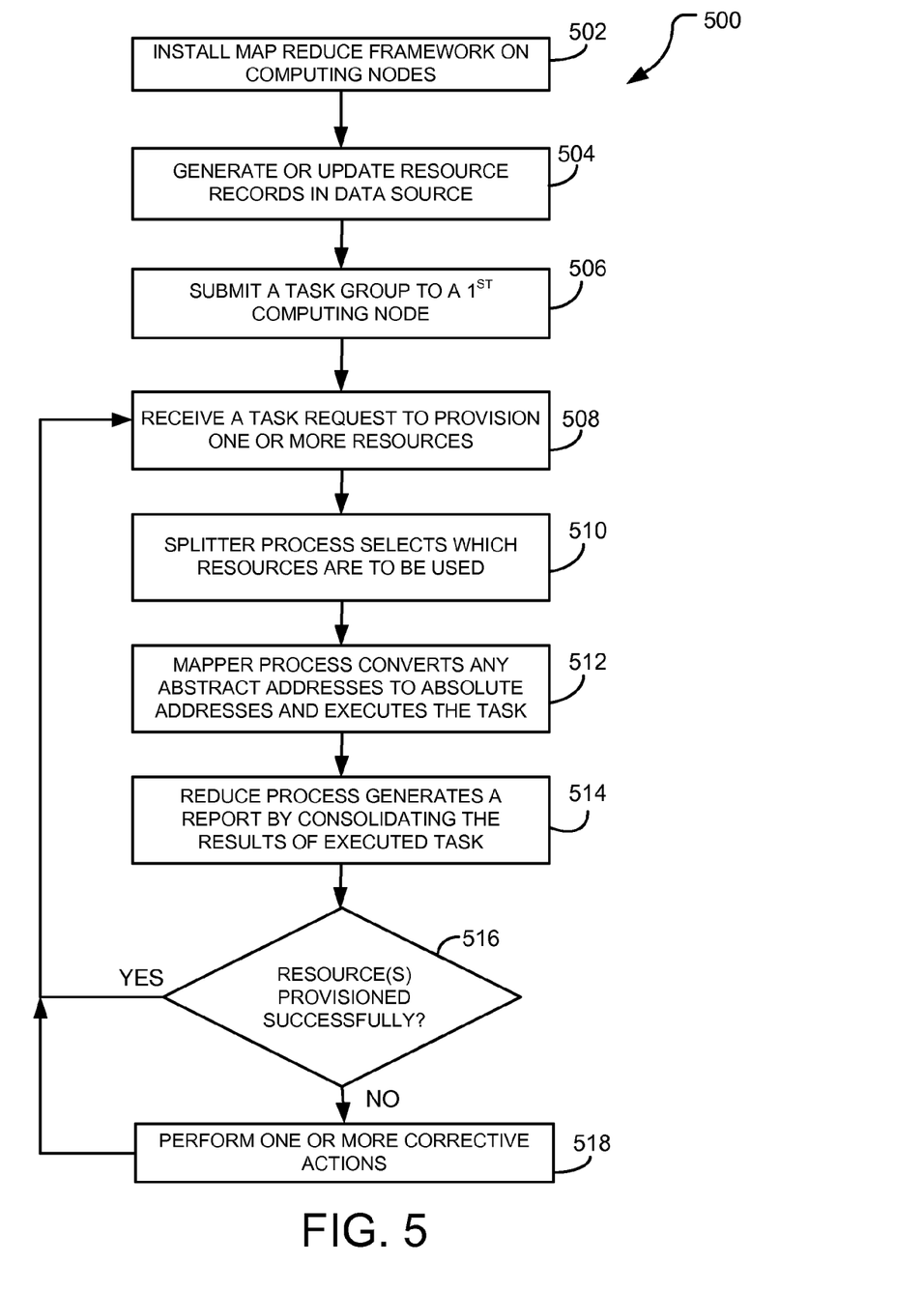
FIG. 5 illustrates an example process showing how the resources to be allocated for supporting a distributed application may be provisioned according to one embodiment of the present disclosure.

FIG. 5 illustrates an example process showing how the resources 112 to be allocated for supporting a distributed application 114 may be provisioned according to one embodiment of the present disclosure. In step 502, the map reduce framework 106 may be installed or loaded on all computing nodes 102 in the distributed computing environment 104 or at least those computing nodes 102 that are to be used for deploying an distributed application 114 in the distributed computing environment 104.

In step 504, resource records 122 are generated or updated in the data source 110. For example, a discovery process may be performed to generate resource records 122 for the resources 112 in the distributed computing environment 104. Information to be included in each resource record 122 may include, for example, whether or not its associated resource 112 is currently allocated for use with another distributed application 114, performance information (e.g., processor speed, processor quantity, amount of memory, etc.), compliance information, and the like.

In step 506, a task group 116 may be submitted to a first computing node 102' for deploying an distributed application 114 in the distributed computing environment 104. The task group 116 may be submitted to the map reduce framework 106 of any computing node 102 in the distributed computing environment 104 on which the map reduce framework 106 is installed. In one embodiment, the task group 116 is packaged in a package file format, such as the 'jar' format or '.zip' format.

In step 508, the map reduce framework 106 receives a task request to provision at least one resource 112 in the distributed computing environment 104. In one embodiment, the task request may comprise a portion of a task group 116 having multiple tasks 118 and a master script 120 instructing how to execute the multiple tasks 118.

In step 510, a splitter process selects which resources 112 are to be provisioned according to the task request. In one embodiment, multiple selection mechanisms may be provided and the master script 120 indicates which of those selection mechanisms are to be used for each task 118. Then for each selected resource 112, the splitter process transmits a copy of the task 118 to the computing node 102 of each selected resource 112 in step 512.

In step 512, a mapper process configured on the receiving computing node 102 converts any abstract addresses included in the task 118 to absolute addresses and generates a modified task 118, which is then forwarded to the reduce process 322, executes the modified task 118 to provision the resource 112. The reduce process, in step 514, generates a report message 402 that is transmitted back to the map reduce framework 106 configured in the computing node 102 that received the task group 116 indicating whether or not the provisioning attempt was successful or not.

In step 516, the task group receiver/processor module 312 uses the report message(s) from the reduce process to determine whether or not the previous task 118 has been successfully completed. If not, one or more corrective actions (step 518) may be performed, such as instructing the map reduce framework 106 to select one or more other resources 112 to be used, instructing the map reduce framework 106 to perform one or more additional attempts (e.g., re-try) to provisioned the failed resource 112, generating an alert message to indicate to users that the resource 112 has failed. Conversely, if provisioning of all selected resources 112 has been successfully completed, processing continues at step 508 for provisioning of additional resources 112 using other tasks 118.

The previously described process may be repeated to provision other resources 112 for supporting other distributed applications 114. Nevertheless, when use of the map reduce framework 106 is no longer needed or desired, the process ends.

Although FIG. 5 describes one example of a process that may be performed by the system for provisioning resources to support a distributed application 114 in a distributed computing environment 104, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
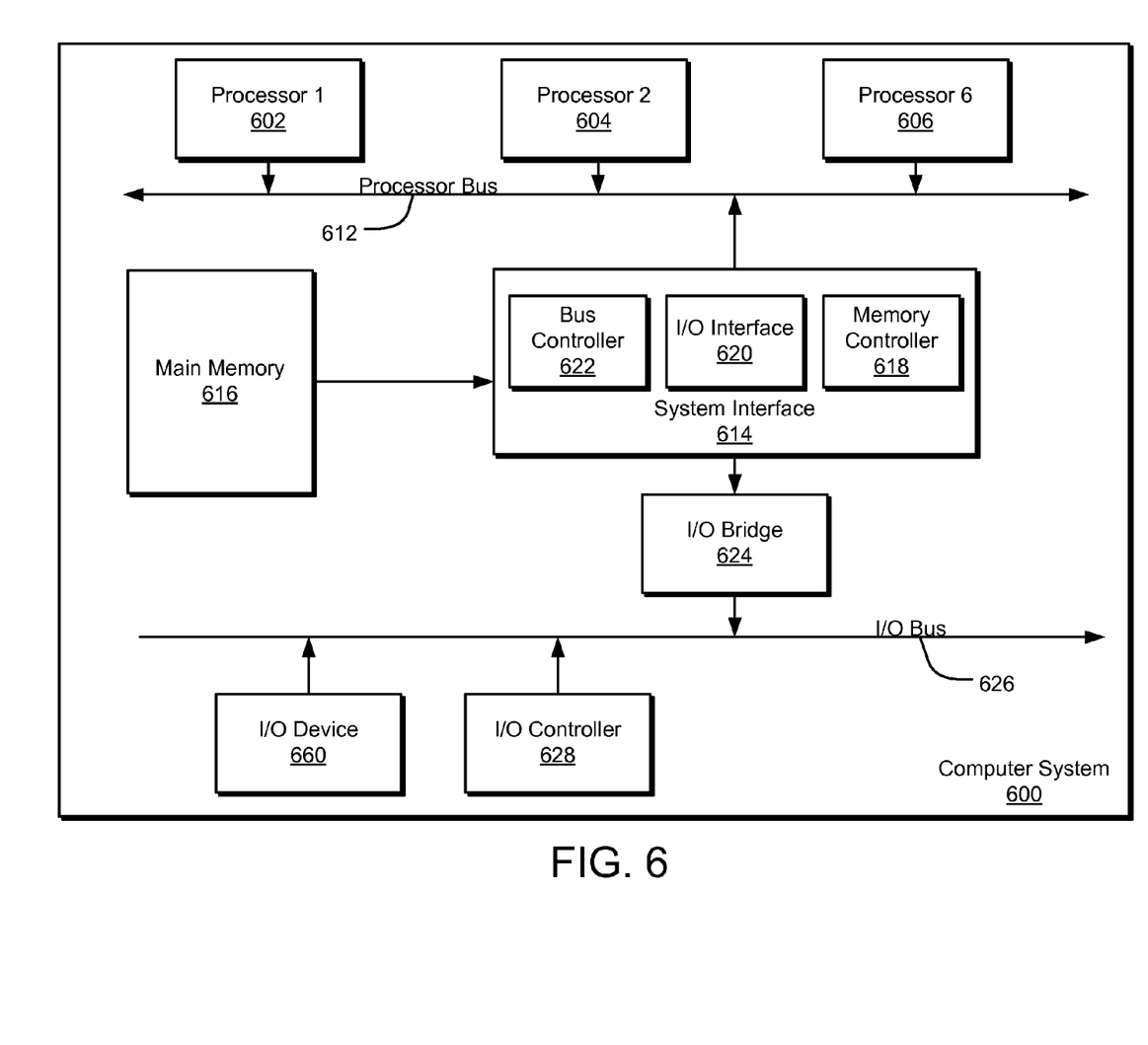
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A provisioning system for a distributed computing environment, the provisioning system comprising:
   a map reduce framework stored in at least one memory and executed on at least one processor of each of a plurality of computing nodes comprising one or more resources, the plurality of computing nodes comprising the distributed computing environment, the map reduce framework comprising:
      a splitter process to receive a task associated with a distributed application to be deployed on the distributed computing environment, and select which of the resources are to be provisioned for executing the distributed application;
      a mapper process to convert at least one abstract address included in the task to an absolute address, and execute the task for provisioning the selected resources; and
      a reduce process to consolidate results of the executed task.

2. The provisioning system of claim 1, wherein the splitter process is executed on a first computing node, and the mapper process and the reduce process are executed on one or more second computing nodes, and wherein the selected resources are configured on the second computing nodes.

3. The provisioning system of claim 1, wherein the absolute address is associated with a resource management application to provision the selected resource.

4. The provisioning system of claim 1, wherein the reduce process generates a report message indicating whether or not the task completes successfully, and wherein the mapper process to perform one or more corrective actions when the report message indicates that the task has not completed successfully, the corrective actions comprising at least one of instructing the map reduce framework to select one or more other resources to be provisioned, instructing the map reduce framework to perform one or more additional attempts to provision the selected resource, and generating an alert message to indicate that the provisioning of the selected resource has failed.

5. The provisioning system of claim 1, wherein the reduce process determines a type of the task, and select an executor to execute the task according to the type of the task.

6. The provisioning system of claim 1, wherein the map reduce framework comprises a commercial off-the-shelf map reduce application.

7. The provisioning system of claim 1, further comprising logic to select which of the resources are to be provisioned for executing the distributed application is in communication with an application program interface (API) of the splitter process, convert at least one abstract address included in the task to an absolute address is in communication with an application program interface (API) of the mapper process, and execute the task for provisioning the selected resources is in communication with an application program interface (API) of the reduce process.

8. The provisioning system of claim 1, wherein the splitter process to select resources according to at least one of an automatic selection process, a system wide selection process, or a specific resource selection process.

9. The provisioning system of claim 1, wherein the mapper process receives and processes a task group for provisioning the resources, the task group comprising a plurality of the tasks and a master script that is executed to control how the plurality of tasks are processed.

10. A provisioning method for a distributed computing environment, the provisioning method comprising:
    receiving, using instructions stored in a non-transitory, computer-readable medium and executed on at least one processor, a task associated with a distributed application to be deployed on the distributed computing environment, and select which of the resources are to be provisioned for executing the distributed application using a splitter process of a map reduce framework;
    converting, using the instructions, at least one abstract address included in the task to an absolute address using a mapper process of a map reduce framework;
    executing, using the instructions, the task for provisioning the selected resources using the mapper process of a map reduce framework; and
    consolidating, using the instructions, results of the executed task using a reduce process.

11. The provisioning method of claim 10, further comprising executing the splitter process on a first computing node, and executing the mapper process and the reduce process on one or more second computing nodes, wherein the selected resources are configured on the second computing nodes.

12. The provisioning method of claim 10, wherein the absolute address is associated with a resource management application configured to provision the selected resource.

13. The provisioning method of claim 10, further comprising generating, using the reduce process, a report message indicating whether or not the task completes successfully, and performing one or more corrective actions when the report message indicates that the task has not completed successfully.

14. The provisioning method of claim 10, further comprising determining a type of the task, and selecting an executor to execute the task according to the type of the task using the reduce process.

15. The provisioning method of claim 10, wherein the map reduce framework comprises a commercial off-the-shelf map reduce application.

16. The provisioning method of claim 10, further comprising selecting the resources according to at least one of an automatic selection process, a system wide selection process, or a specific resource selection process.

17. The provisioning method of claim 10, further comprising receiving and processing a task group for provisioning the selected resources, the task group comprising a plurality of the tasks and a master script that is executed to control how the plurality of tasks are processed.

18. Code implemented in a non-transitory, computer readable medium that when executed by at least one processor, to perform at least the following:
   receiving a task associated with a distributed application to be deployed on the distributed computing environment, and select which of the resources are to be provisioned for executing the distributed application using a splitter process of a map reduce framework;
   converting at least one abstract address included in the task to an absolute address using a mapper process of a map reduce framework;
   executing using the instructions, the task for provisioning the selected resources using the mapper process of a map reduce framework; and
   consolidating results of the executed task using a reduce process of the map reduce framework.

19. The code of claim 18, further configured to perform determining a type of the task, and selecting an executor to execute the task according to the type of the task using the reduce process.

20. The code of claim 18, further configured to perform generating, using the reduce process, a report message indicating whether or not the task completes successfully, and performing one or more corrective actions when the report message indicates that the task has not completed successfully.

\* \* \* \* \*